United States Patent
Merkel et al.

(10) Patent No.: US 6,505,377 B1
(45) Date of Patent: Jan. 14, 2003

(54) WIPER ARM

(75) Inventors: Wilfried Merkel, Kappelrodeck (DE); Peter De Block, Halen (BE); Roger Daenen, Vlytingen-Riemst (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,399

(22) PCT Filed: Aug. 5, 1998

(86) PCT No.: PCT/DE98/02251

§ 371 (c)(1), (2), (4) Date: Jun. 1, 1999

(87) PCT Pub. No.: WO99/08911

PCT Pub. Date: Feb. 25, 1999

(30) Foreign Application Priority Data

Aug. 14, 1997 (DE) .......................... 197 35 301

(51) Int. Cl.[7] .................................. B60S 1/32
(52) U.S. Cl. ............... 15/250.351; 15/250.352
(58) Field of Search ............... 15/250.351, 250.352, 15/250.34, 250.202, 250.04, 250.31

(56) References Cited

U.S. PATENT DOCUMENTS

| | | | | |
|---|---|---|---|---|
| 3,427,675 A | * | 2/1969 | Tibbet et al. | 15/250.351 |
| 4,133,071 A | * | 1/1979 | Jaske | 15/250.351 |
| 5,724,699 A | * | 3/1998 | Bexten | 15/250.351 |

FOREIGN PATENT DOCUMENTS

| | | | | |
|---|---|---|---|---|
| EP | 579550 | * | 1/1994 | |
| GB | 838419 | * | 6/1960 | 15/250.352 |
| WO | 93/11978 | * | 6/1993 | 15/250.352 |

\* cited by examiner

*Primary Examiner*—Gary K. Graham
(74) *Attorney, Agent, or Firm*—Michael J. STriker

(57) ABSTRACT

A wiper arm of a windshield wiper has a driven fastening part which is pivotably connected to a joint part, the joint part is rigidly joined by a wiper rod (18, 62), at least one of the parts of the wiper arm is shaped from sheet metal, at least one of the parts formed from sheet metal has at least one region with a plurality of material layers folded up onto one another.

11 Claims, 5 Drawing Sheets

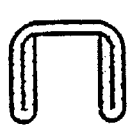
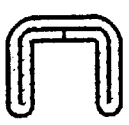
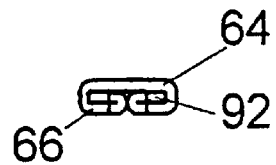
Fig. 12          Fig. 13          Fig. 14
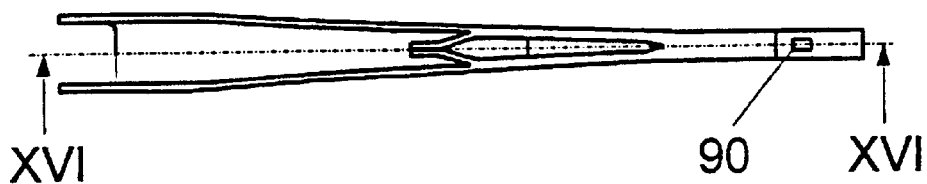
Fig. 15
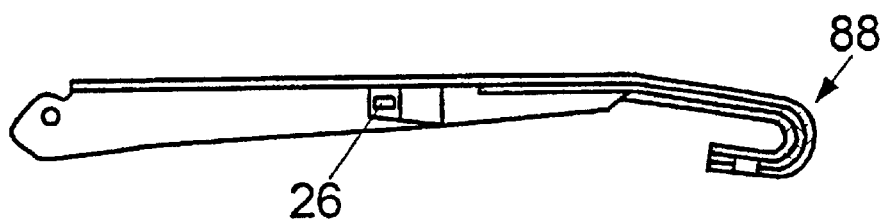
Fig. 16

WIPER ARM

BACKGROUND OF THE INVENTION

The invention relates to a wiper arm as generically.

Known windshield wipers have a wiper arm, which is made up of a driven fastening part, a joint part connected to it via a toggle joint, and a wiper rod rigidly adjoining the joint part. The windshield wiper also have a wiper blade, which has a support bracket system and a wiper strip retained thereby. The wiper blade is pivotably connected to the wiper arm in that a hooklike end of the wiper rod engages between two lateral cheeks of the support bracket system and includes a pivot pin. The joint thus formed guides the wiper blade with the wiper strip over the motor vehicle window; the joint part and the support bracket system make it possible for the wiper strip to adapt to a curvature of the motor vehicle window. A required contact pressure of the wiper strip on the vehicle window is attained with at least one tension spring, which braces the fastening part and the joint part, jointly with the wiper rod, via the toggle joint.

The shape of the individual components of the wiper arm is influenced by various demands and stresses; specifically, they should be as torsionally rigid, deflection-resistant, and narrow in the field of view as possible, so that the wiper blade can be guided without vibration and under control over the vehicle window yet present little hindrance to the field of view.

The fastening part transmits the drive moment from the drive axis to the wiper blade, via the joint part and the wiper rod. It also forms part of the toggle joint, by way of which the fastening part is braced with the joint part by the tension spring and pressed in the direction of the vehicle window. The greatest forces or moments arise in the fastening part, both parallel to the window and perpendicular to the window. Furthermore, deformations in the lower region of the windshield wiper have an especially strong effect over the entire length and can cause uneven wiping speeds as a result of a spring effect. The fastening part and the first portion of the joint part must therefore be embodied as especially deflection-resistant and torsion-resistant.

In a wiping motion, the second portion of the joint part moves partly, and the wiper rod moves completely, through the field of view of the driver, and as a result they must be made not only torsion- and deflection-resistant but also especially narrow, so that the impede the view as little as possible.

Furthermore, the wiper arm should be shaped in such a way that it is not listed away from the vehicle window by the relative wind.

Known wiper arms have a wide fastening part and a joint part that is made of sheet metal and that is still relatively wide in the region of the fastening part, that is, at the lower edge of the field of view, often with a U profile that is open toward the window. Because of its favorable resistance moment, it is especially torsion- and deflection-resistant in this region, and the tension spring can be received, concealed, in the U profile. In the direction toward the free end or toward the connection point with the wiper rod, the joint part tapers so that it is narrow in the field of view. Over the full length of the joint part, the profile has a constant material thickness, determined by the sheet metal used; this thickness is designed for the desired dimensional stability at the greatest material stress to be expected, which is substantially composed of bending and torsion stresses, specifically perpendicular and parallel to the vehicle window.

As a rule, the wiper rod is formed by a rod profile of constant material thickness, which is crimped to the joint part.

The material stresses in the wiper arm depend on various factors. On drive forces and contact pressure forces, on their engagement points, lever arms, and on resistance moments of the wiper arm. Since the shaping cannot be adapted solely to the courses of stress and to sagging, but instead still other aspects must be considered, such as creating a space for stowing the tension spring, effective wind engagement faces, and in particular a slender structure in the field of view, and so forth, great and variable material stresses occur at various points. Often, the material demands are greatest in the connection point of the wiper rod to the joint part and in the wiper rod itself, because of the small cross-sectional area and unfavorable resistance moments. The material thickness of the joint part is determined by the material stress at the connection point with the wiper rod, and the wiper rod is entirely formed of a thicker material.

Since the material thickness for the joint part and for the wiper rod must be designed for the greatest material stress, regions subject to less stress are made oversized. This means unnecessarily high consumption of material, high material costs, and high weight, and this is all the more true if the parts made of sheet metal are meant to be made from sheet-metal panels of constant thickness or integrally.

SUMMARY OF THE INVENTION

According to an embodiment of the invention, for the portions of the wiper arm formed of sheet metal, that is, the fastening part and in particular the joint part and the wiper rod, a variable number of material layers can be folded up onto one another in various regions, until the material thickness required for the particular cross section is attained. The material can be bent over a single time or multiple times by approximately 180°, or distant surface regions can be folded up in one or preferably multiple steps in order to brace one another.

The folded-up material layers act over all in the corresponding regions virtually like a material that is thicker throughout. Thus from a relatively thin sheet metal, different material thicknesses can be attained in different regions, and these thicknesses can be adapted exactly to different stresses that arise. Only in the regions subject to high material stresses are greater material thicknesses attained by the folding technique. Over all, a thinner sheet-metal thickness can be used for these parts. Furthermore, the faces resting on one another damp vibration and thus largely suppress jittering of the wiper strip on the vehicle window, or cause any jittering to fade again quickly.

The connection point of the wiper rod to the joint part is usually already located fairly far into the field of view and must therefore be made narrow, with a small cross-sectional area. Furthermore, often along with high material strains from the drive moment and strains from the tension spring occur from the fastening of the wiper rod to the joint part, and these are superimposed on the other material stresses. In one embodiment of the invention, it is proposed that the joint part be reinforced, in the region of the connection point with the wiper rod, by a plurality of material layers folded onto one another, thus compensating for the small cross-sectional area.

The proportion of the area that is multilayered can be varied with infinite graduation via the length of the portions, for instance by having one layer taper obliquely in the longitudinal direction. As a result, the portions can be adapted favorably to constant moment courses, or to courses of material stress.

In order not to limit the field of view, the joint part tapers greatly longitudinally from the drive axis to the wiper rod. As a result, the cross-sectional area decreases and the material stress increases. It is therefore proposed that with respect to the cross-sectional area, the portion having a plurality of material layers folded onto one another increase longitudinally. If the joint part has an advantageous U profile, this is attained in that beginning at the articulation point to the fastening part, lateral cheeks first and then adjoining them a top side of the U profile are embodied increasingly with two or more material layers.

In addition, it is also possible to achieve higher resistance in targeted individual regions, for instance those where forces attack them directly, by folding two or more material layers onto one another in these regions.

By the folding technique, low material costs are attained by thinner sheet-metal thicknesses, less trimming waste, and low weight. At low sheet-metal thicknesses, it is also possible to use more-economical, more weakly dimensioned cutting tools, so that a smaller interstice is needed between the forms to be cut out. As a rule of thumb, a spacing of three times the sheet-metal thickness should be maintained. Lesser sheet-metal thicknesses thus lead to less trimming waste.

Along with the described economies and favorable design options, transitions of attractive shape between different material thicknesses in an one-piece component can be created using the folding technique.

The sheet-metal parts known until now for the wiper arm are partly cut out side by side from a larger sheet-metal panel, so that upon further deformation they do not affect one another and still can be transported favorably. Especially with the tapering form of the joint part, when the sheet-metal parts are aligned identically, there is a large area of trimming waste in the narrower region. According to the invention, it is proposed that this area be utilized as fold faces. The sheet-metal parts are thus made from one-piece flat sheet-metal panels with contour faces and with fold faces adjoining the contour faces. The contour faces are used for the fundamental shaping of the sheet-metal part, and the fold faces are used for fastening regions and, to attain different material thicknesses. The material is better utilized; that is, trimming waste is largely avoided, and the material costs are thus reduced. If furthermore in the flat state of the sheet-metal part the fold faces are located in a rectangle defined by the contour faces, and if this rectangle is virtually entirely filled with the two faces, the material can be utilized even better, and trimming waste can be reduced still further. It is also possible for the fold faces to extend past the rectangle and to be supplemented with fold faces of adjoining identical or different components with an identical or different alignment.

In known wiper arms, the wiper rod is secured to the joint part on one end, for instance being crimped, welded, etc. In this end, in known wiper rods, a spring hanger is made in the form of a hole for a tension spring, with which the fastening part and the wiper rod are jointly braced with the joint part. The wiper rod extends past the region of fastening to the joint part in the direction of the fastening part, so that the tension spring can be made shorter and can be favorably disposed in the still-wider lower region of the joint part. In one feature of the invention, the spring hanger is formed onto the joint part. The wiper rod can be made shorter as a result, thus saving material, weight and expense. The spring hanger can be made in a single-walled contour of the joint part. According to the invention, however, the spring hanger is formed from fold faces onto the joint part, so that favorably a spring hanger that is concealed from the outside and is adapted exactly in terms of wall thickness to the stress can be attained without weakening the contour of the joint part by making recesses in it.

As already described above, the wiper rod is usually joined to the joint part by crimping. If the joint part, in the region of the connection point with the wiper rod, has a plurality of material layers and if at least the material layer that comes into contact with the wiper rod has one or more detent holes, then favorable snap connections that can be made releasable can be created between the joint part and the wiper rod. The complicated connection by crimping is dispensed with, and even already painted wiper rods and joint parts can be joined together. If the detent holes do not pass through all the material layers and are thus concealed from the outside, then no water or dirt can collect in them, and thus attractively shaped snap connections that are not vulnerable to corrosion or dirt can be created.

If the joint part, in the region of the connection point with the wiper rod, has a hollow profile, then the wiper rod can be secured especially securely in a torsion-and deflection-resistant way. The hollow profile can have detent holes on its top and bottom sides for the wiper rod.

In one feature of the invention, the joint part and wiper rod are made of a one-piece sheet-metal part. The wiper arm has fewer individual parts and can be made in an attractive shape without a transition between individual components. This also saves one assembly step in joining together the wiper rod and the joint part. Since the wiper rod is located directly in the field of view, it should be made especially narrow with a small cross section. To compensate for the small cross section and attain a sufficiently torsion- and deflection-resistant wiper rod, it is proposed that the wiper rod be formed of at least two material layers folded onto one another.

In relatively short wiper arms, for instance for rear-window wipers, the production material is utilized well despite the one-piece joint part and the wiper rod, without producing major quantities of trimming waste. With longer wiper arms, sheet steel is preferably used, so that for an acceptable material thickness, a sufficiently rigid construction can be achieved.

Before the sheet-metal parts are bent or bent over in production, recesses are made in the still-flat sheet-metal panels; after the bending operation, these recesses form the detent holes or fastening holes. A plurality of recesses can favorably be made simultaneously by simple means in the flat sheet-metal panels.

BRIEF DESCRIPTION OF THE DRAWINGS

In the drawing, exemplary embodiments of the invention are shown. Numerous characteristics are shown and described in conjunction with one another in the specification and claims. One skilled in the art will expediently consider the characteristics individually as well and make useful combinations of them.

Shown are:

FIG. 12, a section taken along the line XII—XII in FIG. 11;

FIG. 13, a section taken along the line XIII—XIII in FIG. 11;

FIG. 14, a section taken along the line XIV—XIV in FIG. 11;

FIG. 15, an elevation view of a joint part, joined in one piece to a wiper rod, sen from below and having a fastening region for a wiper blade; and FIG. 16, a section taken along the line XVI—XVI in FIG. 15.

DETAILED DESCRIPTION OF THE DRAWINGS

Figure 1:
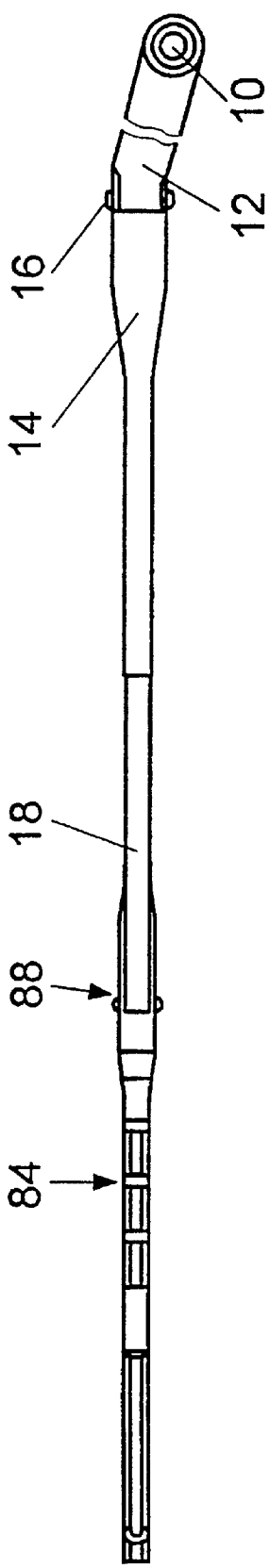
FIG. 1, a wiper arm with a wiper blade.

The windshield wiper shown in FIG. 1 has a wiper arm which is secured by a fastening part 12 to a drive axis 10. A joint part 14 is pivotably connected, together with a wiper rod 18, to the fastening part 12, and a wiper blade 84 is suspended by a hooklike end 88 from the wiper rod.

Figure 2:
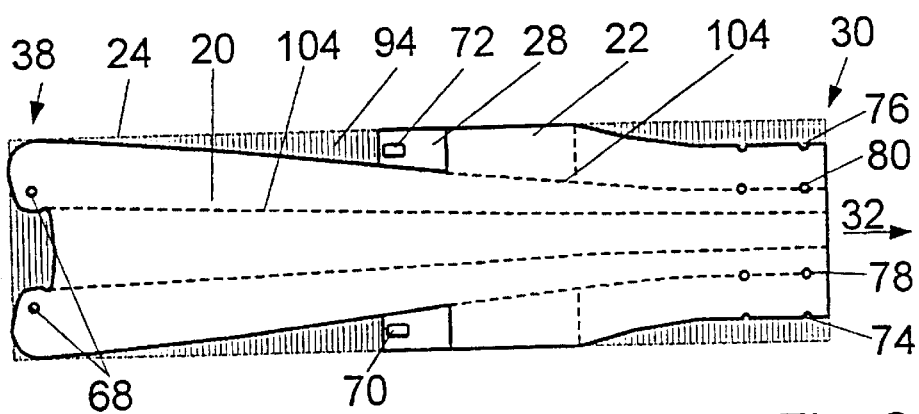
FIG. 2, a still unbent sheet-metal part for a joint part.

In FIG. 2, a still flat sheet-metal part for a joint part 14 is shown, which has cut faces 94, fold faces 22, 28, and contour faces 20. The fold faces 22, 28 are cut away from the cut faces 94, jointly with the contour faces 20, by a cutting process or stamping process; the cut faces become trimming waste. The fold faces 22, 28 are located in a rectangle 24, which is defined by the contour faces 20 and is virtually completely filled by the faces 22, 28, 20, so that favorably in production, a plurality of joint parts 14 can be disposed side by side without creating large quantities of trimming waste.

Figure 3:
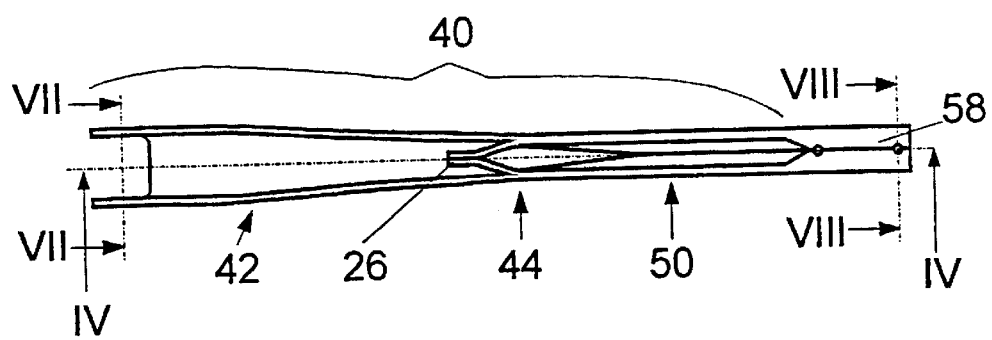
FIG. 3, a joint part from below.

From the contour faces 20 and the fold faces 22, 28, the joint part 14 is shaped in one or more operations, in that the contour faces 20 are bent at bending edges 104, as a rule by approximately 90°, and the fold faces 22, 28 are bent by approximately 180° (FIG. 3). The contour faces 20, after the bending or bending over operation essentially produce the outer contour, which is preferably formed, at least in the region 40 beginning at an articulation point 38 with the fastening part 12, from a U profile (FIG. 3). The fold faces 22, 28 serve, in certain regions of the joint part 14, to create greater wall thicknesses from a plurality of material layers 34, 36 and detent holes 54, 56 or fastening holes 26, for instance in that they are bent over once or multiple times in one or more operations by approximately 180°, or opposed faces 28 are folded up (FIGS. 4–8).

From the articulation point 38 with the fastening part 12, the joint part 14 becomes shallower and narrower (FIGS. 3 and 4) in the longitudinal direction 32 to a connection point 30 with the wiper rod 18. With the decrease in the deployed cross-sectional area of the U profile, the torsional and deflection resistance simultaneously decrease. It is proposed that over the cross section of the joint part 14, the portion having a plurality of material layers 34, 36 folded onto one another increase from the articulation point 38 with the fastening part 12 to the connection point 30 with the wiper rod 13. The joint part 14 thus has only one material layer 34 over all of a first portion 42, while in a second portion 44 lateral cheeks 46, 48 of the U profile are made with two material layers 34, 36, and in a third portion 50, the lateral cheeks 46, 48 and a top side 52 of the U profile are made with two material layers 34, 36 (FIGS. 3–7).

Figure 4:
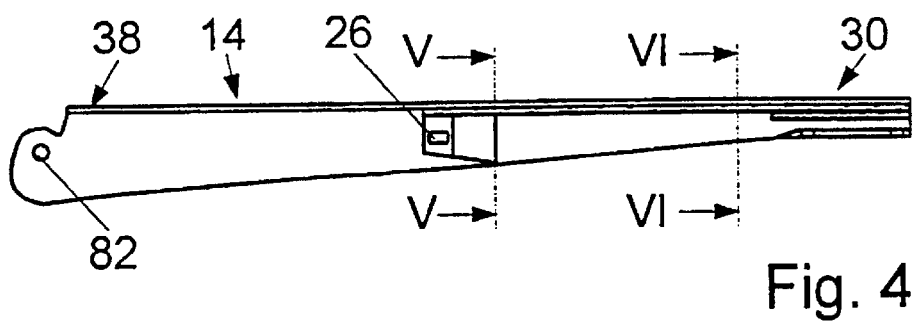
FIG. 4, a section taken along the line IV—IV in FIG. 3.
Figure 5:
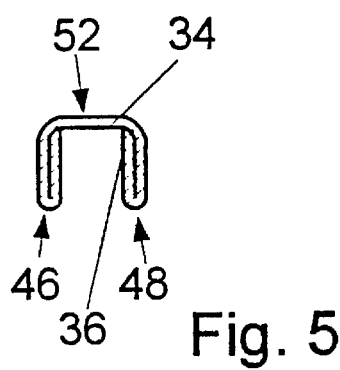
FIG. 5, a section taken along the line V—V in FIG. 4.
Figure 6:
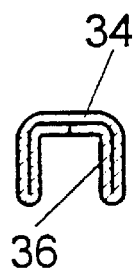
FIG. 6, a section taken along the line VI—VI in FIG. 4.
Figure 7:
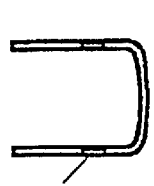
FIG. 7, a section taken along the line VII—VII in FIG. 3.

In addition, the fold faces 22, 28 can be utilized for fastening points 26. It is especially advantageous if a spring hanger 26 is formed onto the joint part 14, and specifically if recesses 72 (FIG. 2) are made in fold faces 28, which recesses, after the folding, form the spring hanger 26 (FIGS. 3 and 4).

Figure 8:
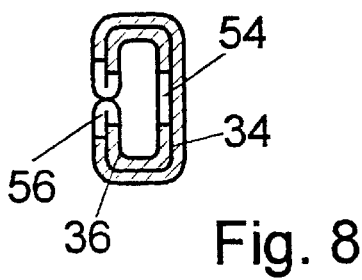
FIG. 8, a section taken along the line VIII—VIII in FIG. 3.
Figure 9:
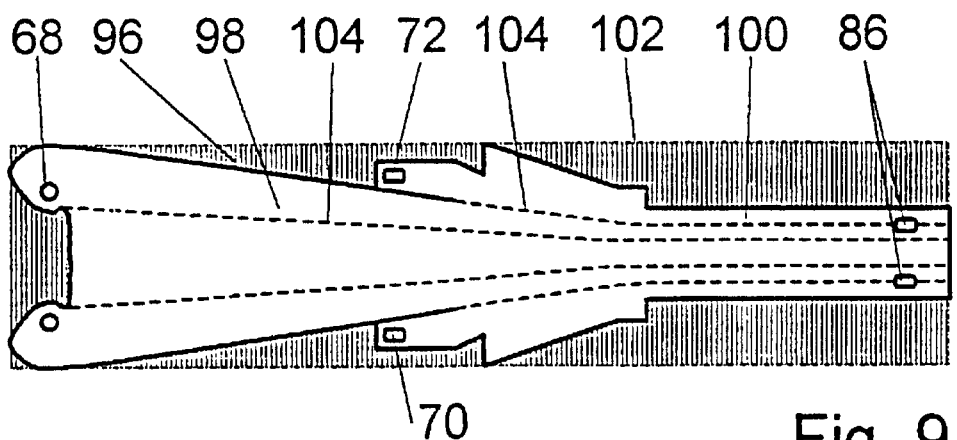
FIG. 9, a still unbent sheet-metal part for a joint part joined in one piece to a wiper rod.
Figure 10:
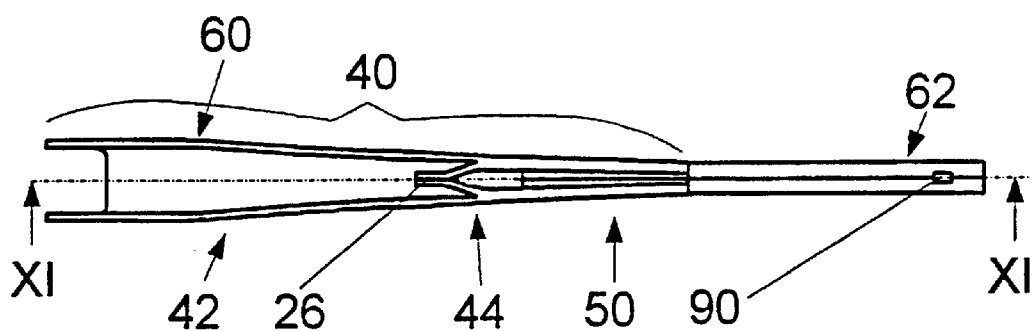
FIG. 10, a joint part joined in one piece to a wiper rod seen from below, still without a fastening region for a wiper blade.

In the connection point 30 of the joint part 14, the wiper rod 18 is secured without play, and as a result stresses occur, caused not only by wind forces and drive forces but also by tension forces. According to the invention, the connection point 30 has a hollow profile 58, which is embodied with multiple material layers 34, 36 over the entire cross section (FIG. 8). However, an open rather than closed profile is also possible.

The wiper rod 18 can be crimped, welded, riveted or in some other known way secured in form-locking or force-locking fashion to the joint part 14. In one feature of the invention, the wiper rod 18 is secured to the joint part 14 by a detent connection, which can be made either releasable or nonreleasable. To that end, detent holes 54, 56 are disposed in the hollow profile 58 in the region of the connection point 30, specifically in the upper region of the hollow profile 58, on the side pointing away from a motor vehicle window, only in the material layer 36 that comes into contact with the wiper rod 18, while in the lower region they are provided in both material layers 34, 36 (FIG. 8). Toward the top side, the detent holes 54 are concealed and are thus protected against soiling, corrosion and so forth, and a visually attractively shaped surface is achieved. In the lower region, the detent mechanism can be actuated by the material layers 34, 36, for instance to be pressed out of the detent position and to release the wiper rod 18 from the joint part 14. The lower detent holes 56 may, however, also be made only in the inner material layer 36, concealed from the outside.

Recesses 68, 70, 72, 74, 76, 78, 80 for the detent holes 54, 56, for the spring hanger 26, and for a fastening point 82 for a shaft 16 that connects the joint part 14 and the fastening part 12 are preferably made in the flat sheet-metal part in FIG. 2 that has not yet been bent or folded. These recesses may be made in a plurality of operations or advantageously in a single operation.

In FIGS. 9–16, an embodiment of the invention is shown in which the joint part 60 and wiper rod 62 are embodied integrally; specifically, they are bent or folded at bending edges 104 (FIG. 9) from a one-piece sheet-metal part with cut faces 96, contour faces 98 and fold faces 100. The joint part 60 is embodied virtually identically to that in the version of FIGS. 2–8. Comparable regions and parts are therefore identified by the same reference numerals, examples being the spring hanger 26, the fastening point 82, the bending edges 104, etc. Analogously to the first version, the fold faces 100 are again located in a rectangle defined by the contour faces 98.

Figure 11:
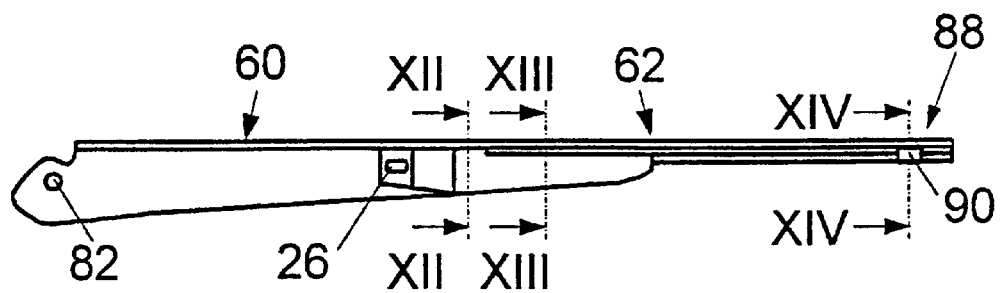
FIG. 11, a section taken along the line XI—XI in FIG. 10.

The wiper rod 62 must be made very thin and narrow so that it limits the field of view as little as possible and does not present a large attack face to the wind. To assure that despite the resultant small cross-sectional area the wiper rod will have high deflection and torsion resistance, according to the invention the wiper rod 62 is formed by a plurality of material layers 64, 66, 92 folded onto one another (FIGS. 11 and 14). In the exemplary embodiment shown, the fold faces 100 are bent over twice by approximately 180°, and they thus form three material layers 64, 66 and 92 (FIG. 14); however, it is also possible for them to be bent over only once or even more than twice, in one or preferably one or more than one production step. Sheet-metal thicknesses between 2 or 1.5 mm appear favorable, with which wiper rods 62 of variable width can be formed that have a material thickness of 2.0, 4.0, 6.0 and 8.0, or 1.5, 3.0, 4.5 and 6.0 mm, and so forth.

Once the wiper rod 62 has been folded up of a plurality of material layers 64, 66, 92, a hook is bent onto the free end 88, and the wiper blade 84 is suspended from it and as a rule secured by a detent connection (FIGS. 15 and 16). For the detent connection, a fastening hole 90 is made in the wiper rod 62 in the region of the hook; this hole is formed by recesses 86 in the fold faces 100, once the wiper rod 18 has been folded and the recesses 86 have been placed one above the other in the process. The fastening hole 90 can extend through all the material layers 64, 66, 92, or preferably can extend through only the two inner layers 66, 92. The recesses 68, 70, 72, 86 for the spring hanger 26, for the fastening hole 90, and for the shaft 16 by way of which the joint part 60 is joined to the fastening part 12 are made analogously to the first exemplary embodiment in the still-flat sheet-metal part, in more than one step or in a single step.

As the material for long joint parts 14, wiper rods 18, or one-piece joint parts 60 and wiper rods 62, sheet steel is suitable, with which adequate deflection and torsion resistance is attained at acceptable material thicknesses.

What is claimed is:

1. A windshield wiper arm comprising a driven fastening part (12) which is pivotably connected to a joint part (14, 60), which is rigidly adjoined by a wiper rod (18, 62), wherein at least one of the parts (12, 14, 16, 18, 62) is shaped from sheet metal, said at least one of the parts (12, 14, 60, 18, 62) formed from sheet metal having at least one region having a plurality of material layers (34, 36, 64, 66, 92) folded up onto one another, wherein the joint part (14, 60) tapers longitudinally (32) beginning at an articulation point (38) with the fastening part (12) and ending at a connection point (30) with the wiper rod (18, 62), and a cross-sectional area of the part having a plurality of material layers (34, 36) folded onto one another increases in a direction from the articulation point (38) to the connection point (30) with the wiper rod, wherein the joint part (14, 60), in a region (40) beginning at the articulation point (38) with the fastening part (12), has a U-shaped profile, and in a first portion (42) the U-shaped profile is formed entirely by only one material layer (34) and in a second portion (44), lateral cheeks (46, 48) of the U-shaped profile at least partly have at least two material layers (34, 36); and in a third portion (50) the U-shaped profile additionally, on its top side (52) at least partly comprises at least two material layers (34, 36) folded onto one another.

2. The windshield wiper arm of claim 1, wherein the parts (14, 18, 60, 62) shaped from sheet metal are produced from one-piece sheet-metal panels with contour faces (20, 98) and fold faces (22, 28, 100), and the fold faces (22, 28, 100) are located in a rectangle (24, 102) defined by the contour faces (20, 98).

3. The windshield wiper arm of claim 1, wherein the joint part (14, 60) is shaped from sheet metal and in a region of the connection point (30) with the wiper rod (18, 62) at least partly has a plurality of material layers (34, 36) folded onto one another.

4. The windshield wiper arm of claim 1, wherein points for fastening (26, 54, 56, 90) are provided in the fold faces (22, 28, 100).

5. The windshield wiper arm of claim 4, wherein at least a material layer (36) of the joint part (14) that comes into contact with the wiper rod (18) has detent holes (54, 56) for the wiper rod (18) at the connection point (30).

6. The windshield wiper arm of claim 1, wherein the joint part (14, 60), jointly with the wiper rod (18, 62), is braced with the fastening part (12) via at least one tension spring, and a spring hanger (26) is disposed on the joint part (14, 60).

7. The windshield wiper arm of claim 6, wherein the spring hanger (26) is made in fold faces (28).

8. The windshield wiper arm of claim 1, wherein the joint part (14), at the connection point (30) with the wiper rod (18), has a hollow profile (58).

9. The windshield wiper arm of claim 1, wherein the joint part (60) and the wiper rod (62) are made integrally of sheet metal.

10. The windshield wiper arm of claim 9, wherein the wiper rod (62) is formed at least partly of at least two material layers (64, 66, 92) folded onto one another.

11. The windshield wiper arm of claim 1, wherein at least one of the joint part (14, 60) and the wiper rod (18, 62) is made of sheet metal.

* * * * *